(12) United States Patent
Lee et al.

(10) Patent No.: US 10,880,187 B2
(45) Date of Patent: Dec. 29, 2020

(54) SYSTEM AND METHOD FOR CALCULATING DISTRIBUTED NETWORK NODES' CONTRIBUTION TO SERVICE

(71) Applicant: DATA ALLIANCE CO., LTD., Seoul (KR)

(72) Inventors: Kwang Bum Lee, Bucheon-si (KR); Ki Soo Lee, Seongnam-si (KR)

(73) Assignee: DATA ALLIANCE CO., LTD., Seoul (KR)

( * ) Notice: Subject to any disclaimer, the term of this patent is extended or adjusted under 35 U.S.C. 154(b) by 0 days.

(21) Appl. No.: 16/467,307

(22) PCT Filed: Dec. 6, 2017

(86) PCT No.: PCT/KR2017/014227
§ 371 (c)(1),
(2) Date: Jun. 6, 2019

(87) PCT Pub. No.: WO2018/106012
PCT Pub. Date: Jun. 14, 2018

(65) Prior Publication Data
US 2019/0363952 A1     Nov. 28, 2019

(30) Foreign Application Priority Data

Dec. 7, 2016  (KR) .......................... 10-2016-0166101

(51) Int. Cl.
*G06F 13/00* (2006.01)
*H04L 12/24* (2006.01)
*H04L 29/08* (2006.01)

(52) U.S. Cl.
CPC ...... *H04L 41/5035* (2013.01); *H04L 41/5096* (2013.01); *H04L 67/12* (2013.01)

(58) Field of Classification Search
CPC ......... H04L 67/12; H04L 29/08; H04L 12/66; H04L 41/5035; H04L 41/4096;
(Continued)

(56) References Cited

U.S. PATENT DOCUMENTS

| 9,128,995 B1 | 9/2015 | Fletcher et al. |
| 2002/0026482 A1 | 2/2002 | Morishige et al. |

(Continued)

FOREIGN PATENT DOCUMENTS

KR          10-1555315 B1      9/2015

OTHER PUBLICATIONS

Seung-gyu Byeon et al., "Contribution-Level-Based Opportunistic Flooding for Wireless Multihop Networks", Journal of KIISE, vol. 42, No. 6, pp. 791-800, Jun. 2015; English abstract.

*Primary Examiner* — Kenneth R Coulter
(74) *Attorney, Agent, or Firm* — Rabin & Berdo, P.C.

(57) ABSTRACT

A method for calculating distributed network nodes' contribution to a service according to the present disclosure comprises the steps of: receiving, by a server, details of contribution to a service from a plurality of nodes; verifying, by the server, the received details of contribution to a service; announcing, by the server, the verified details of contribution to a service; and using a block chain including a block that includes the announced details of contribution to a service issued by one of the plurality of nodes, calculating the one node's contribution to a service. According to the present disclosure, it is possible to calculate distributed network nodes' contribution to a service. It is also possible to separately calculate the degrees of contribution of distributed network nodes to a specific service. Further, it is possible to ensure the transparency of the details of calculation of distributed network nodes' contribution to a service.

12 Claims, 3 Drawing Sheets

(58) Field of Classification Search
CPC . H04L 41/5096; H04L 63/12; H04L 2209/38;
H04L 2209/805; H04L 9/3239; H04L
43/06; H04L 43/0876; H04L 43/08; H04L
41/0866; H04L 41/0853; H04L 67/2809
USPC .............. 709/201, 230, 232, 234, 235, 203;
718/100, 104–107
See application file for complete search history.

(56) References Cited

U.S. PATENT DOCUMENTS

| | | |
|---|---|---|
| 2006/0126603 A1 | 6/2006 | Shimizu et al. |
| 2008/0215668 A1 | 9/2008 | Hu |
| 2010/0161817 A1 | 6/2010 | Xiao et al. |
| 2014/0359131 A1 | 12/2014 | Seed et al. |
| 2016/0088049 A1 | 3/2016 | Seed et al. |
| 2016/0105338 A1 | 4/2016 | Fletcher et al. |
| 2018/0158034 A1* | 6/2018 | Hunt .................... G06Q 20/027 |
| 2018/0165588 A1* | 6/2018 | Saxena ................. G06F 19/324 |
| 2019/0164241 A1* | 5/2019 | Bassler ................. G06Q 50/18 |
| 2019/0172566 A1* | 6/2019 | Schulman ............. G06F 16/903 |
| 2019/0182284 A1* | 6/2019 | Signorini ................ G09C 1/00 |

* cited by examiner

SYSTEM AND METHOD FOR CALCULATING DISTRIBUTED NETWORK NODES' CONTRIBUTION TO SERVICE

TECHNICAL FIELD

The present disclosure relates to a system and method for calculating distributed network nodes' contribution to a service, and more particularly, to a system and method for calculating network nodes' contribution to a service, capable of calculating contribution to a service, for a gateway that mediates data to enable an end terminal such as an IoT terminal to be connected to a network and exchange data and neighboring nodes that help calculating contributions.

BACKGROUND ART

The term 'Internet of Things (IoT)' first appeared in 1998 at the Massachusetts Institute of Technology (MIT) Auto-ID Labs. Then in 2005, with the publication of the annual report "The Internet of Things" by ITU-T, the Internet of Things has predicted that it will be the most basic framework for all the structures of the future information technology (IT) industry revolution. The report defines the Internet of Things as "a new information communication infrastructure that connects all the things existing in the world to networks so that people and things, and things and things can communicate with each other at anytime and anywhere. In other words, the Internet of Things can be regarded as a true infrastructure for realizing a ubiquitous space. This ubiquitous space starts with computing devices including specific functions being embedded in the environment and things, making the environment or things themselves intelligent.

The Internet of Things is a technology that provides us with a more convenient and safer life. Therefore, various mobile communication companies and terminal manufacturers are focusing on the development of terminals and services for supporting the Internet of Things, which will emerge as a next-generation mobile service.

With the proliferation of IoT technology, low power wide area (LPWA) network technology is emerging, which provides low power capability allowing use for at least a year with a single battery and effective communication distance of 10 km or more. This has led into emergence of LPWA technologies such as LoRa and Sigfox using non-licensed Industrial Scientific and Medical (ISM) bands in the market, and mobile carriers are also attempting to secure infrastructure and provide services using technologies using the above technologies that use ISM bands.

In order to expand services that use LPWA network technology, it is required that the gateways for supporting LPWA networks are installed nationwide. Telecommunications carriers have installed the gateway supporting LPWA nationwide or are scheduled to do so.

Meanwhile, attempts have been made recently to build the shared LPWA networks in a way of sharing the proprietary LPWA without being subordinate to a large telecommunication company.

Technical Problem

Accordingly, it is an object of the present disclosure to provide a method and system for calculating IoT network nodes' contribution to a service in a shared LPWA network.

Technical Solution

According to an aspect of the present disclosure, there is provided a system for calculating IoT network nodes' contribution to a service, which may include a plurality of gateways that mediate data between an IoT terminal and an application server, a server that receives details of contribution to a service from the plurality of gateways and announces the received details of contribution to a service, and a participating terminal that collects and verifies the details of contribution to a service announced by the server for a predetermined time period, and issues a block that includes the verified details of contribution to a service, in which the system may calculate the gateways' contribution to a service using a block chain that includes the issued block.

According to an aspect of the present disclosure, there is provided a method for calculating IoT network nodes' contribution to a service, which may include receiving details of contribution to a service from a plurality of gateways that mediates data between an IoT terminal and an application server, announcing, by the application server, the details of contribution to a service, and calculating the gateways' contribution to a service by using a block chain that includes a block issued by a participating terminal, in which the participating terminal may collect and verify the details of contribution to a service announced by the server for a predetermined time period, and issue a block that includes the verified details of contribution to a service.

According to an aspect of the present disclosure, there is provided a method for calculating network nodes' contribution to a service, which may include receiving, by a server, details of contribution to a service from a plurality of nodes, verifying, by the server, the received details of contribution to the service, announcing, by the server, the verified details of contribution to a service; and using a block chain including a block that includes the announced details of contribution to a service issued by one of the plurality of nodes, calculating the one node's contribution to a service.

The plurality of nodes may include a plurality of gateways that mediate data between an end terminal and a network server.

Owners of the plurality of gateways may be different from each other.

The method may further include announcing, by the server, a verification key corresponding to the verified details of contribution to a service.

The server may include an electronic signature in the verified details of contribution to a service and announce the verified details of contribution to a service.

The plurality of nodes may verify the announced details of contribution to a service using the verification key.

The node that issues the block may include, in the block, a plurality of details of contribution to a service collected and verified for a predetermined time period.

The details of contribution to a service may include a node identifier and a measurement value for each contribution measurement item.

The measurement value for each contribution measurement item may include at least one of a number of packets transmitted by a node per unit period, a network connection time of the node per unit period, an area of a region serviced by the node per unit period, a computing power used by the node per unit period to calculate the contribution, and a total network connection time of the node.

The measurement value for each the contribution measurement item may be measured separately for each of services to which the end terminal is registered.

The node's contribution to a service is calculated for each of the services.

According to an aspect of the present disclosure, there is provided a system for calculating network nodes' contribution to a service, which may include a server that receives details of contribution to a service from a plurality of nodes, verifies the received details of contribution to a service, announces the verified details of contribution to a service, and using a block chain including a block that includes the announced details of contribution to a service issued by one of the plurality of nodes, calculates the one node's contribution to a service.

According to another aspect of the present disclosure, there is provided a method for calculating network nodes' contribution to a service, which may include receiving, by a server, details of contribution to a service from a plurality of nodes, verifying, by the server, the received details of contribution to the service, announcing, by the server, the verified details of contribution to a service, and calculating, by the server, the nodes' contribution to a service using the verified and announced details of contribution to a service.

According to another aspect of the present disclosure, there is provided a system for calculating network nodes' contribution to a service, which may include a server that: receives details of contribution to a service from a plurality of nodes, verifies the received details of contribution to a service, announces the verified details of contribution to a service, and calculates the nodes' contribution to a service using the verified and announced details of contribution to a service.

The plurality of nodes may include a plurality of gateways forming a low power wide area (LPWA) network, in which owners of the gateways are different from each other.

Effects of the Invention

According to the present disclosure, it is possible to calculate network nodes' contribution to a service. It is also possible to separately calculate the degrees of contribution of network nodes to a specific service. Further, it is possible to ensure the transparency of the details of calculation of network nodes' contribution to a service.

BEST MODE

Hereinafter, preferred embodiments of the present disclosure will be described in detail with reference to the accompanying drawings so that those with ordinary knowledge in the art may easily achieve the present disclosure.

Figure 1:
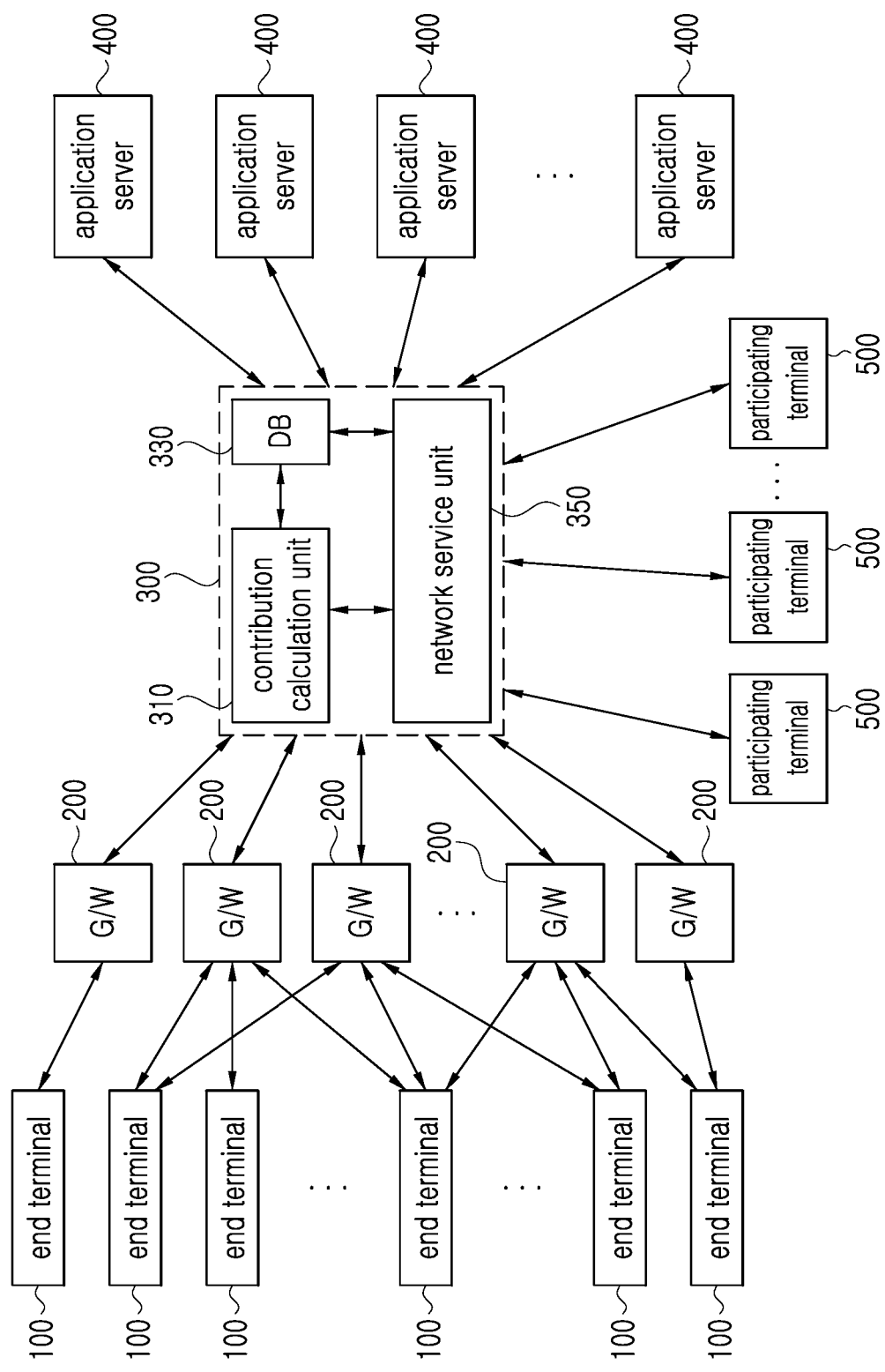
FIG. 1 is a block diagram illustrating a configuration of a system for calculating network nodes' contribution to a service according to an embodiment.

FIG. 1 is a block diagram illustrating a configuration of a system for calculating network nodes' contribution to a service according to an embodiment.

Referring to FIG. 1, an end terminal 100 may transmit data generated from a sensor and a user to a gateway 200 or may receive the data from the gateway 200 to provide a service. The end terminal 100 may be an object device having a communication function, that is, an IoT terminal.

The IoT terminal may include various sensors, information providing devices, convenience facilities, gaming devices, security devices, home appliances, and the like.

The data generated from the end terminal 100 may be transmitted to an application server 400 through the gateway 200 and a network server 300, and conversely, the data may be transmitted from the application server 400 to the end terminal 100 through the network server 300 and the gateway 200.

The application server 400 performs a function of providing a certain service to a user according to the data transmitted from the end terminal 100. The service provided by the application server 400 may vary widely according to embodiments.

The gateway 200 may perform a data mediation function by transferring the data received from the end terminal 100 to the network server 300, or conversely, by transferring the data received from the network server 300 to the end terminal 100.

There may be different owners of the gateway 200 and the owners may share their gateways 200 for other users to use and be paid with a portion of the profit therefrom.

The end terminal 100 and the gateway 200 may transmit and receive data in a broadcast manner. The end terminal 100 and the gateway 200 may transmit and receive data using low power wide area network (LPWAN) method using unlicensed band (ISM band) such as ultra narrow band (UNB) or long range wide area network (LoRaWAN).

The gateway 200 and the network server 300 may transmit and receive data using an IP-based protocol. The communication network between the gateway 200 and the network server 300 includes local area network (LAN), metropolitan area network (MAN), wide area network (WAN), the Internet, 2G, 3G, 4G, LTE mobile communication network, Bluetooth, Wi-Fi, WiBro, satellite communication network, and the like, and may use any communication method including both wired or wireless.

The network server 300 performs a function of exchanging data between the end terminal 100 and the application server 400. Specifically, the network server 300 may perform a function of transmitting the data received from the end terminal 100 to the application server 400 to which the corresponding end terminal 100 is registered, and also transmitting the data received from the application server 400 to the end terminal 100.

The network server 300 may include a contribution calculation unit 310, a database (DB) 330, and a network service unit 350.

The network service unit 350 performs a function of exchanging data between the end terminal 100 and the application server 400. To this end, the network service unit 350 has information of mapping the end terminals 100 and the application servers 400, and when receiving the data from the end terminal 100, may perform a function of transferring the information to the corresponding application server 400. In addition, when data transmission is requested from the application server 400 to a specific end terminal 100, the network service unit 350 may transfer the data by transmitting the data to the gateway 200 that is capable of communicating with the corresponding end terminal 100. Meanwhile, when the gateway 200 and the end terminal 100 communicate with each other in the broadcasting manner, in one example, data may be broadcast by being transferred to all the gateways 200, and it is not determined as to which gateway the end terminal 100 is capable of communicating with.

The database 330 may perform a function of storing various data related to the operation of the network server 300. As described above, mapping information, such as, which application server 400 is for service to the end terminal 100, and so on. In addition, owner information of the gateway 200 may also be registered and stored in the database 330.

In particular, a block chain including details of IoT network nodes' contribution to a service of may be stored in the database 330 according to the present disclosure. It goes without saying that in addition to the database 330, the IoT network nodes may store the block chains.

In this example, the IoT network node means a node participating in an operation such as data exchange between the end terminal 100 and the application server 400 or calculation of resultant contribution, and can be understood as a concept incorporating all of the gateway 200, a terminal 500, and the network server 300.

The contribution calculation unit 310 performs a function of calculating the IoT network nodes' contribution to a service.

The details of the IoT network nodes' contribution to a service and a method of calculating the same will be described in more detail below.

The participating terminal 500 is a terminal participating in the operation of calculating the IoT network nodes' contribution to a service, and unlike the gateway 200, the participating terminal 500 is not put into the data exchange between the end terminal 100 and the application server 400.

A method of calculating each network nodes' contribution to a service in a network system including the end terminal 100, the gateway 200, the network server 300, the application server 400, and the participating terminal 500 will be described below.

Figure 2:
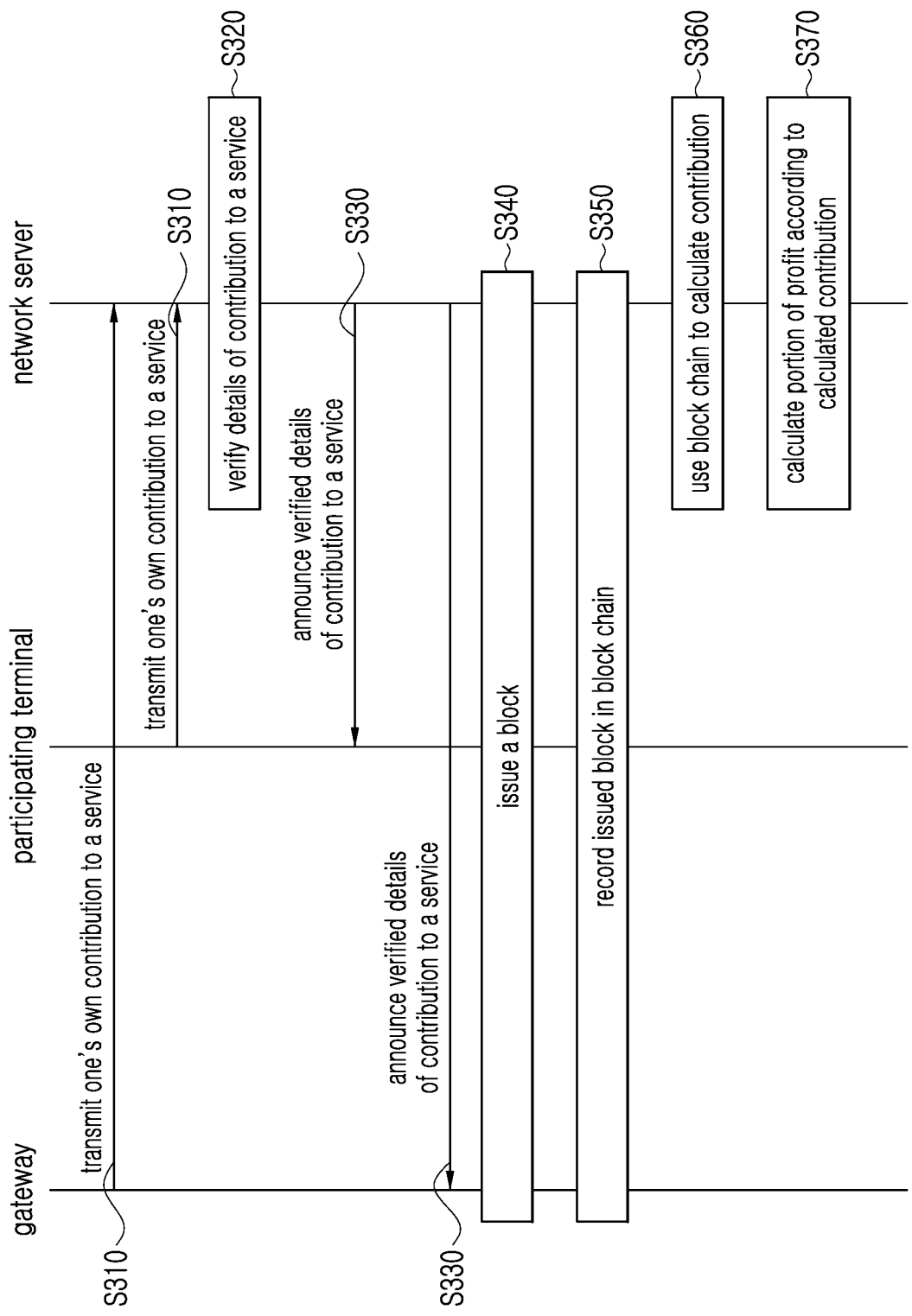
FIG. 2 is a flowchart provided to explain an operation of a system for calculating network nodes' contribution to a service according to an embodiment.

FIG. 2 is a flowchart provided to explain an operation of a system for calculating network nodes' contribution to a service according to an embodiment.

Referring to FIGS. 1 and 2, first, the gateway 200 or the participating terminal 500 transmits details of its contribution to a service to the network server 300, at S310.

The details of contribution to a service transmitted at S310 may include a node identifier and a measurement value for each contribution measurement item. The node identifier may be a unique value for identifying the gateway 200 or the participating terminal 500 in the network, that is, a MAC address, IP, and the like, or may be separately-given identification information.

The measurement value for each contribution measurement item may include the number of packets (p) transmitted through the node per unit period, a network connection time (t) of the node per unit period, an area (a) of the region serviced by the node per unit period, a computing power (c) used by the node per unit period to calculate the contribution, a total network connection time (T) of the node, and the like.

In this example, the unit period may be set to a preset time, which may be 10 minutes, 1 hour, and the like.

The number of packets (p) transmitted through the node per unit period may be defined as the number of packets exchanged between the end terminal 100 and the network server 300 during the unit period by the gateway 200.

The network connection time (t) of the node per unit period means the time in which the gateway 200 is connected to the network server 300 and performs a data exchange operation between the end terminal 100 and the network server 300 during the unit period.

The area (a) of the region serviced by the node per unit period may be estimated based on the common packets received by the gateways 200 including the GPS receiving devices. For example, when it is assumed that the gateway A and the gateways B, C, and D receive common packets, the range of service coverage of the A gateway may be estimated based on the GPS position information of the B, C, and D gateways.

The computing power (c) used by the node per unit period to calculate the contribution means the computing power used by the node during the unit period for the operation of issuing a block containing the details of contribution to a service described below, recording a block in a block chain, and the like. While the number of packets (p), the network connection time (t) and the area (a) of the service area are measured for contribution to the gateway 200 only, the computing power (c) used for calculating the contribution is measured when both the gateway 200 and the participating terminal 500 perform the corresponding operation.

A total network connection time (T) of the node means a total cumulative time of the network connection time (t) of the gateway 200. This is an item added for giving an incentive to the owner who first participates in the network system and shares the gateway 200.

In the details of contribution to a service, other than the items described above may also be added, and some of the items described above may be omitted. This may be determined according to the contribution calculation policy and may be changed.

Meanwhile, it is also possible to distinguish the measurement values of each item included in the details of contribution to a service based on the service provided by the application server 400. In this case, the gateway 200 may check from the network server 300 regarding for which service the specific end terminal 100 is used, that is, to which application server 400 the specific end terminal 100 is registered, and distinguish the measurement values of each item in the details of contribution to a service for each service.

Thereafter, the network server 300 verifies the details of contribution to a service received from each node such as the gateway 200 or the participating terminal 500, at S320.

Next, the network server 300 may announce the verified details of contribution to a service, at S330. At S330, the details of contribution to a service may be announced to each node such as the gateway 200 or the participating terminal 500.

In this example, by the 'announcement', it refers to a data transfer among the node participating in the network, in which a certain node transfers data to neighboring nodes in a communication network, and then the neighboring nodes transfer the data to another nodes.

In this way, the gateway 200 or the participating terminal 500 itself may obtain measurement values for each contribution measurement item corresponding to its own contribution to a service, transmit a result to the network server 300 to be verified and then announced again so that transparency may be improved.

At S330, the network server 300 may issue and separately announce a verification key for verifying the respective verified details of contribution to a service. Each details of contribution to a service may include identification information for identifying the corresponding details. In addition, the details of contribution to a service announced at S330 may also include an electronic signature of the network server 300.

Then, the gateway 200 or the participating terminal 500 may collect the details of contribution to a service announced at S330, perform a verification operation with the verification key, and then perform an operation of issuing a block including a plurality of details of contribution to a service that are collected and verified for a predetermined time period, at S340. The operation of issuing a block may be performed through competition by the gateways 200 or the participating terminals 500 and may be performed in a well-known block chain manner.

The block including the details of contribution to a service may include the details of contribution to a service collected during a predetermined time period, a hash value of the previous block, and Nonce and a hash value of the corresponding block.

Figure 3:
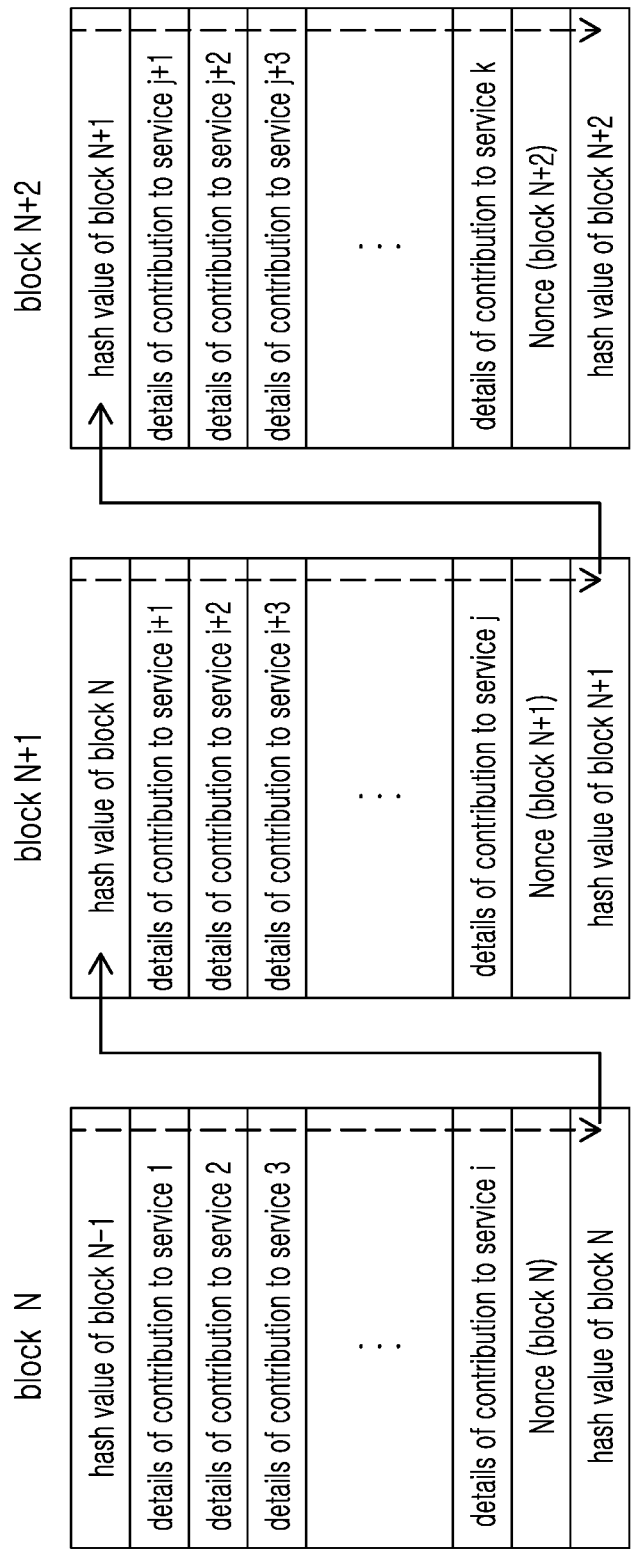
FIG. 3 is a block diagram illustrating a block chain including details of contribution to a service according to an embodiment.

FIG. 3 is a block diagram illustrating a block chain including details of contribution to a service according to an embodiment.

Referring to FIG. 3, a block (N) may include the hash value of a previous block (N−1), and the details of contribution to a service (1 to i) of a plurality of nodes collected and verified for a period of time corresponding to the block (N), and the Nonce and the hash value of the corresponding block (N). Each node performs an operation of obtaining a hash value of the corresponding block (N) satisfying a predetermined rule, while changing the hash value of the block (N−1), the details (1 to i) of contribution to a service of a plurality of nodes, and the Nonce of the corresponding block (N). The first node that obtains the hash value of the corresponding block (N) satisfying the predetermined rule may issue the block (N). In addition, the other nodes may verify this and record the verified block in the block chain.

In this manner, using the hash value of the block (N), the block (N+1) including the details (i+1 to j) of contribution to a service collected and verified during the next period is obtained and recorded in the block chain, and likewise, using the hash value of block (N+1), it is possible to continuously perform an operation of obtaining the block (N+2) including the details (j+1~k) of contribution to a service collected and verified during the next period and recording the block (N+2) in the block chain.

In this way, the details of contribution to a service of each node is continuously recorded in the block chain as a block unit, which may be verified and confirmed by the respective nodes, which enables management of the details of the network nodes' contribution to a service of with transparency.

Referring again to FIG. 2, the contribution calculation unit 310 of the network server 300 may calculate the nodes' contribution to a service using the block chain that includes the details of contribution to a service, at S360.

At S360, the contribution to a service may be calculated for each service or may be calculated without distinguishing the services. In addition, it is possible to use, for the calculation, the details of contribution to a service included in the block corresponding to a predetermined time period. For example, when it is assumed that the contribution to a service is calculated on a monthly basis, the contribution to a service may be calculated by collecting the details of contribution to a service included in a block corresponding to one month.

The contribution to a service may be calculated using Equation 1 below.

$$Cont_i = C_1 \frac{p_i}{\sum_{k=1}^{n} p_k} + C_2 \frac{t_i}{\sum_{k=1}^{n} t_k} +$$ [Equation 1]

-continued
$$C_3 \frac{a_i}{\sum_{k=1}^{n} a_k} + C_4 \frac{c_i}{\sum_{k=1}^{n} c_k} + C_5 \frac{T_i}{\sum_{k=1}^{n} T_k} + \ldots$$

where $n$: total number of nodes $$\sum_{k=1}^{q} C_k = 1, q\text{: total number of parameter}$$

$$\therefore \sum_{k=1}^{n} Cont_k = 1$$

where $Cont_i$ is the contribution to a service of the (i)th node.

In addition, $p_i$ is the number of packets transmitted by the (i)th node during the time period of contribution calculation, $t_i$ is the network connection time of the (i)th node during the time period of contribution calculation, $a_i$ is the area of the region serviced by the (i)th node during the time period of contribution calculation, $c_i$ is the computing power used by the (i)th node to calculate the contribution during the time period of contribution calculation, and $T_i$ is the total network connection time of the (i)th node. As described above, when items to be measured for contribution calculation are changed according to embodiments, corresponding item (parameter) may be added or deleted in Equation 1.

Meanwhile, $C_1$, $C_2$, $C_3$, $C_4$, $C_5$, and $C_k$ are weights assigned to each measurement item. When calculating the contribution to a service, higher weights may be given to important items, or lower weights may be given to less important items. When calculating contribution to a service for each service, $C_1$, $C_2$, $C_3$, $C_4$, $C_5$, and $C_k$ may be assigned differently for each service.

When the contribution to a service is calculated for each node in this way, the contribution calculation unit 310 may calculate the profit for the owner of each node according to the calculated contribution.

For example, an operator of the application server 400 may charge a fee according to a network use based on a predetermined basis, and calculate the portions of the profit obtained therefrom according to the contribution.

It goes without saying that the portions of the revenues from this shared LPWA network operation may also be calculated according to the contribution.

Meanwhile, when the contributions are divided for each service as described above, the calculation of the profit share obtained from each service may be performed according to the contribution to each service. It goes without saying that it is also possible to calculate the portions of the profit by summing up the total contribution to a service without distinguishing services and also summing up the profits from the shared LPWA network operation.

Meanwhile, although the details of contribution to a service has been described as being distributed and stored in each node participating in the shared LPWA network in a block chain manner, embodiment is not limited thereto, and a modification is possible, in which the details of contribution to a service may be distributed and stored in each node participating in the shared LPWA network in a manner other than the block chain method. Further, the network server 300 may store the details of contribution to a service and provide some or all of the stored details according to a request from each node. For example, in an embodiment, the network server 300 may announce the details of contribution to a service, while the network server 300 stores and manages an account book of the details of contribution to a service as a basis for the calculation of shares or charges.

Embodiments of the present disclosure include a computer-readable medium that includes program instructions for performing various computer-implemented operations. The medium records a program for executing the method described above. The medium may include program instructions, data files, data structures, etc., alone or in combination. Examples of such medium include magnetic medium such as hard disks, floppy disks and magnetic tape, optical recording medium such as CD and DVD, floptical disk and magneto-optical medium, hardware devices configured to store and execute program instructions, such as ROM, RAM, flash memory, etc. Examples of program instructions include machine language codes such as those generated by a compiler, as well as high-level language codes that may be executed by a computer using an interpreter, and so on.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A method for calculating network nodes' contribution to a service, comprising:
   receiving, by a network server, details of contribution to a service from a plurality of nodes;
   verifying, by the network server, the received details of contribution to the service;
   announcing, by the network server, the verified details of contribution to the service; and
   using a block chain including a block including the announced details of contribution to the service issued by one of the plurality of nodes, calculating the one node's contribution to the service,
   wherein the plurality of nodes includes a plurality of gateways that mediate data between an end terminal and the network server,
   wherein the application server provides the service according to data transmitted from the end terminal,
   wherein owners of the plurality of gateways are different from each other, and
   wherein a contribution to the service of each of the plurality of gateways is calculated and a profit for each of the owners is calculated based on the calculated contribution to the service of each gateway.

2. The method of claim 1, further comprising announcing, by the network server, a verification key corresponding to the verified details of contribution to the service, wherein the network server includes an electronic signature in the verified details of contribution to the service and announces the verified details of contribution to the service, and the plurality of nodes verify the announced details of contribution to the service using the verification key.

3. The method of claim 2, wherein a node that issues the block includes, in the block, a plurality of details of contribution to the service collected and verified for a predetermined time period.

4. The method of claim 3, wherein the details of contributions to the service include a node identifier and a measurement value for each of contribution measurement items.

5. The method of claim 3, wherein the contribution measurement items include at least one of:
   a number of packets transmitted by the node per unit period;
   a network connection time of the node per unit period;
   an area of a region serviced by the node per unit period;
   a computing power used by the node per unit period to calculate the contribution; and a total network connection time of the node.

6. The method of claim 5, wherein measurement values for each of the contribution measurement items are measured separately for each of services to which the end terminal is registered, and the node's contribution is calculated for each of the services.

7. A system for calculating network nodes' contribution to a service, comprising a network server that:
   receives details of contribution to a service from a plurality of nodes;
   verifies the received details of contribution to the service;
   announces the verified details of contribution to the service; and
   using a block chain including a block including the announced details of contribution to the service issued by one of the plurality of nodes, calculates the one node's contribution to the service,
   wherein the plurality of nodes includes a plurality of gateways that mediate data between an end terminal and the network server,
   wherein the network server exchanges data between the end terminal and an application server,
   wherein the application server provides the service according to data transmitted from the end terminal,
   wherein owners of the plurality of gateways are different from each other, and
   wherein a contribution to the service of each of the plurality of gateways is calculated and a profit for each of the owners is calculated based on the calculated contribution to the service of each gateway.

8. The system of claim 7, wherein the network server announces a verification key corresponding to the verified details of contribution to the service, and includes an electronic signature in the verified details of contribution to the service and announces the verified details of contribution to a service, and the plurality of nodes verify the announced details of contribution to the service using the verification key.

9. The system of claim 7, wherein a node that issues the block includes, in the block, a plurality of details of contribution to the service collected and verified for a predetermined time period.

10. The system of claim 9, wherein the details of contributions to the service include a node identifier and a measurement value for each of contribution measurement items.

11. The system of claim 9, wherein the contribution measurement items include at least one of:
    a number of packets transmitted by the node per unit period;
    a network connection time of the node per unit period;
    an area of a region serviced by the node per unit period;
    a computing power used by the node per unit period to calculate the contribution; and a total network connection time of the node.

12. The system of claim 11, wherein measurement values for each of the contribution measurement items are measured separately for each of services to which the end terminal is registered, and the node's contribution is calculated for each of the services.

* * * * *